United States Patent [19]

Amemiya

[11] Patent Number: 5,392,135
[45] Date of Patent: Feb. 21, 1995

[54] IMAGE READING APPARATUS HAVING DIFFERENT READING SPEEDS

[75] Inventor: Masami Amemiya, Tokyo, Japan

[73] Assignee: Canon Kabushiki Kaisha, Tokyo, Japan

[21] Appl. No.: 766,020

[22] Filed: Sep. 26, 1991

[30] Foreign Application Priority Data

Oct. 5, 1990 [JP] Japan .................. 2-266455
Mar. 29, 1991 [JP] Japan .................. 3-066752

[51] Int. Cl.⁶ ................ H04N 1/04; G03B 27/32; G03B 27/72
[52] U.S. Cl. .................. 358/444; 358/486; 358/496; 355/23; 355/24; 355/35
[58] Field of Search .............. 358/496, 486; 355/23, 355/24, 35, 319, 320

[56] References Cited

U.S. PATENT DOCUMENTS

| | | | |
|---|---|---|---|
| 4,743,974 | 5/1988 | Lockwood | 358/496 |
| 4,839,740 | 6/1989 | Yoshida | 358/448 |
| 4,949,189 | 8/1990 | Ohmori | 358/496 |
| 4,951,160 | 8/1990 | Nagahara et al. | 358/486 |
| 5,136,665 | 8/1992 | Inoue | 355/23 |

Primary Examiner—Edward L. Coles, Sr.
Assistant Examiner—Kimberly A. Williams
Attorney, Agent, or Firm—Fitzpatrick, Cella, Harper & Scinto

[57] ABSTRACT

An image reading apparatus having different reading speeds includes carrying structure for carrying an original at one of first and second speeds, the first speed being lower than the second speed. Reading circuitry is provided for reading an image from at least one of the front face and the rear face of the original being carried by the carrying structure, and for supplying an image signal representing the read image. Control circuitry is provided for changing the speed of the carrying means. In one aspect, the speed is changed depending upon whether one face or both faces of the original are to be read. According to another aspect, a level of the image signal representing the read image is changed depending upon the speed of the carrying structure.

13 Claims, 11 Drawing Sheets

IMAGE READING APPARATUS HAVING DIFFERENT READING SPEEDS

BACKGROUND OF THE INVENTION

1. Field of the Invention

The present invention relates to an image reading apparatus and, more particularly, to an image reading apparatus for continuously carrying sheet-like originals, and for reading one or both faces of the carried original images using image sensors arranged along a carrying path.

2. Related Background Art

In recent years, various image data file systems have been proposed. In an image data file system of this type, image data is stored in a file medium such as an optical disk or an optomagnetical disk, the stored image data is retrieved and read out as needed, and the readout image data is reproduced, i.e., printed or displayed.

In order to deal with a dual-face original, the file system comprises an original carrying/reading mechanism. In this mechanism, a single original is carried twice, so that its front face is read first, the original is then reversed, and thereafter, its back face is read. Alternatively, the mechanism is provided with a carrying path having a length twice or more the length of an original to be read, so that the front face of an original is read in the first half of the carrying path, and the back face of the original is then read in the second half of the carrying path.

In the above-mentioned arrangement, images on both the faces can be read. However, in the former twice-carrying type mechanism, in order to read a dual-face original, the original must be manually inserted twice, or a mechanism for automatically inserting the original in a reading unit arranged along the carrying path twice must be arranged. In either case, the sheet insertion operation requires a time twice or more that of a conventional sheet insertion operation. When the mechanism for automatically inserting an original twice is arranged, the arrangement of the original carrying path is complicated, and this leads to not only an increase in manufacturing cost of the system but also an increase in frequency of original jamming.

On the other hand, since the latter single-carrying type mechanism requires the carrying path having a length twice or more that of a conventional mechanism, the sheet insertion operation requires a time twice or more that of a conventional sheet insertion operation, and the size of the system itself undesirably becomes bulky.

Thus, an image reading apparatus, in which two image sensors (solid state image pickup elements such as CCD (charge-coupled device) line sensors) are arranged above and below a carrying path for carrying a sheet-like original as means for easily inputting original data on a dual-face original at high speed, and images on both the front and back faces of the dual-face original are continuously read within one scan line at the same time to perform the subsequent image processing, has been put into practical applications.

However, the above-mentioned image reading apparatus reads two faces of an original which has effective image data on only one face, and image data on an unnecessary face is stored in a file medium such as an optical disk or an optomagnetical disk, thus considerably impairing storage efficiency of a file device.

SUMMARY OF THE INVENTION

The present invention has been made in consideration of the above situation, and has as an object to provide an image reading apparatus which can efficiently execute both a dual-face image reading operation and a single-face image reading operation of an original at high speed.

It is another object of the present invention to provide an image reading apparatus which can efficiently execute a single-face image reading operation of an original using a mechanism for performing a dual-face image reading operation of an original.

It is still another object of the present invention to provide an image reading apparatus suitable for an electronic image file.

It is still another object of the present invention to provide an image reading apparatus which can read an original image at high speed with a compact arrangement.

The above and other objects and effects of the present invention will become apparent from the following description.

BRIEF DESCRIPTION OF THE DRAWINGS

FIGS. 6(A) to 6(F) are timing charts showing a drive timing of a CCD image sensor in a dual-face reading mode;

FIG. 7(A) to 7(F) are timing charts showing a drive timing of the CCD image sensor in a single-face, twice-speed reading mode;

FIG. 8(A) to 8(F) are timing charts showing a drive timing of the CCD image sensor in a single-face, initial reading mode;

FIG. 12(A) to 12(D) are waveform charts for explaining a change state of a pixel signal output of the image reading apparatus.

DETAILED DESCRIPTION OF THE PREFERRED EMBODIMENTS

The preferred embodiments of the present invention will be described in detail below with reference to the accompanying drawings.

First Embodiment

Figure 1:
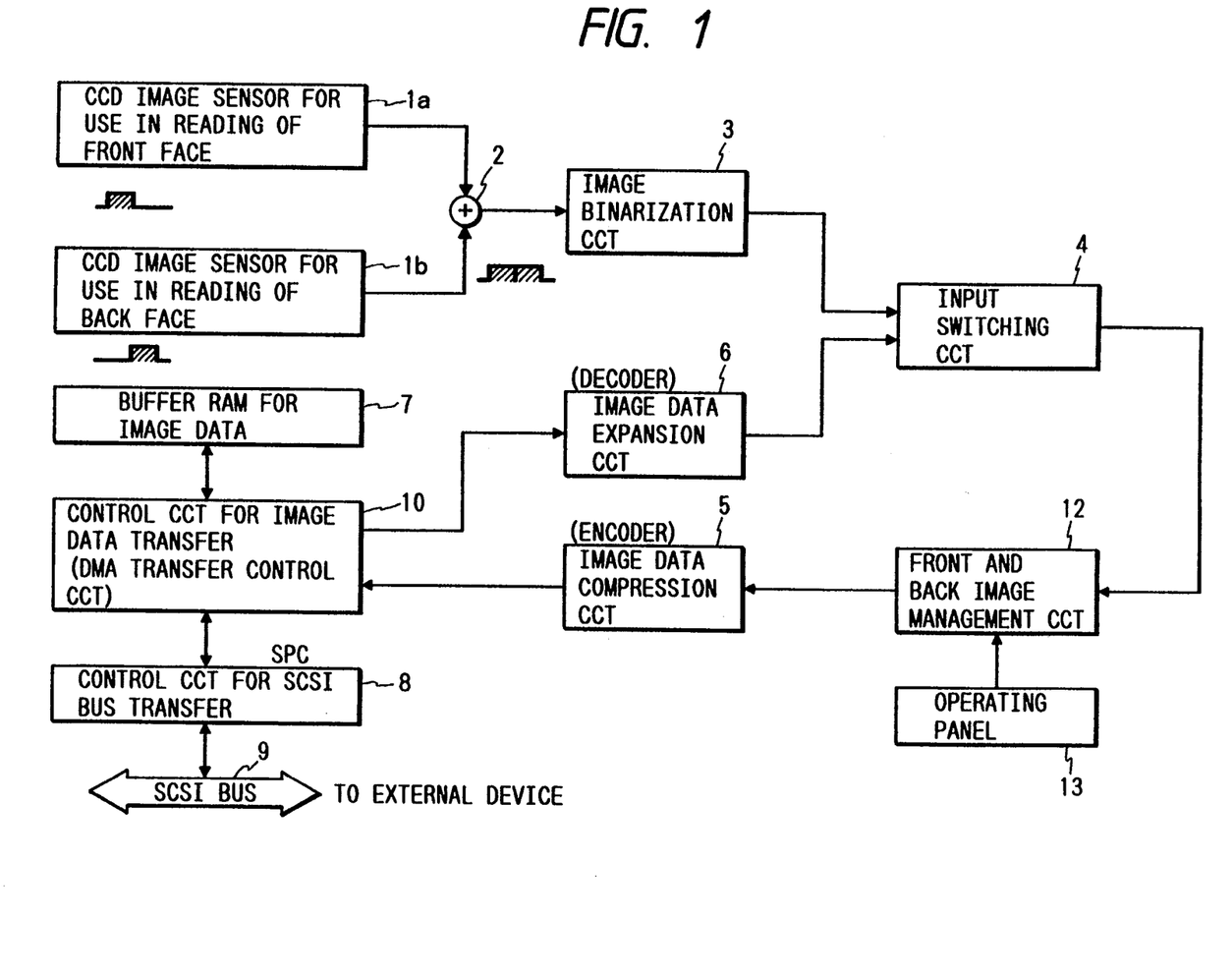
FIG. 1 is a block diagram showing a circuit arrangement of an image reading apparatus according to the first embodiment of the present invention.

FIG. 1 shows a basic circuit arrangement according to the first embodiment of the present invention. An image reading apparatus shown in FIG. 1 comprises CCD image sensors 1a and 1b for simultaneously reading images on the front and back faces of a carried original, a mixing circuit 2 for mixing analog pixel data from the CCD image sensors 1a and 1b to obtain one signal, and an image binarization circuit 3 for A/D (analog-to-digital)-converting analog pixel data from the mixing circuit 2 into digital multi-value pixel data, performing digital image processing necessary for improving image quality, and binarizing the data using an internal digital comparator.

The image reading apparatus further comprises an input switching circuit 4 for selecting one of two binary image data, a front & back image management circuit 12 for receiving an output signal from the input switching circuit 4, and selecting whether front & back batch image data is output as an image to be output to the next stage, or front- or back-face image data is selectively output in accordance with an instruction from an operating panel 13, an image data compression circuit 5 for performing image compression by encoding binary image data from the front & back image management circuit 12, an image data expansion circuit 6 for decoding the encoded image data to binary image data, an image buffer RAM 7 for temporarily storing the encoded image data, a transfer control circuit 8 for performing transfer control with an SCSI (small computer system interface) bus, an SCSI bus 9 for finally outputting image data, and an image data transfer control circuit (DMA transfer control circuit) 10 for performing image data transfer control among the respective devices.

Figure 2:
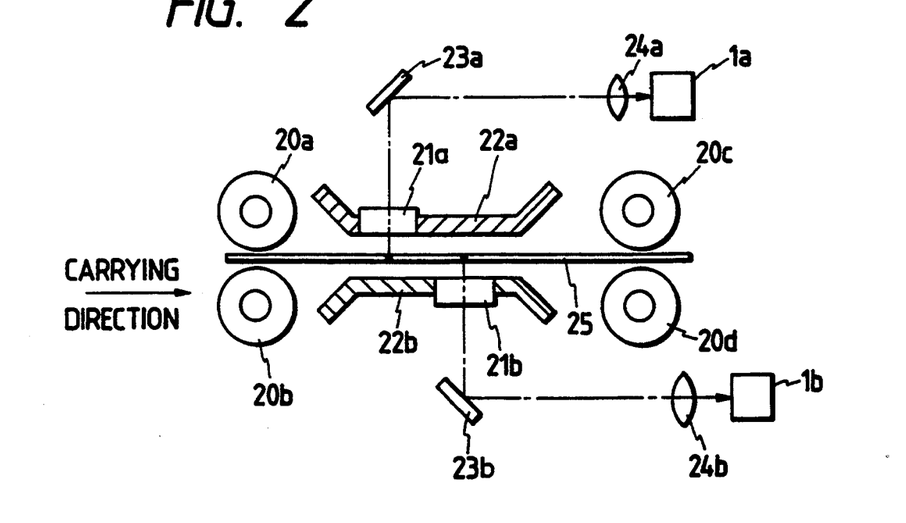
FIG. 2 is a sectional view showing in detail an image reading unit according to the embodiment of the present invention.

FIG. 2 shows in detail a reading unit applied to the embodiment shown in FIG. 1. A dual-face original 25 which is carried by two pairs of carrying rollers 20a, 20b, 20c, and 20d along a path between carrying guides 22a and 22b is read by reading units arranged at substantially the same physical position. An image (reflected light) on the front face of the original 25 is projected and focused on the CCD image sensor 1a for use in reading of the front face along an optical path including a reading glass 21a, a total reflection plate 23a, and a focusing lens 24a. On the other hand, an image (reflected light) on the back face of the original 25 is projected and focused on the CCD image sensor 1b for use in reading of the back face along an optical path including a reading glass 21b, a total reflection plate 23b, and a focusing lens 24b.

Figure 3:
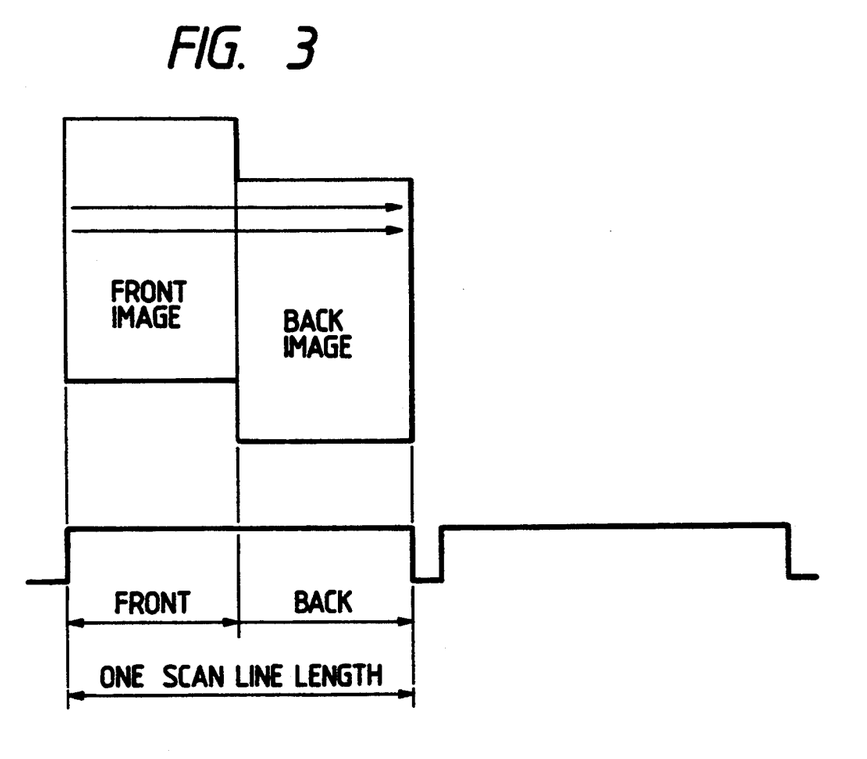
FIG. 3 is an explanatory view showing a reading output state of an image sensor.

Referring back to FIG. 1, the operations of the apparatus of this embodiment will be explained below. Output timings of pixel data read by the two CCD image sensors 1a and 1b are controlled by a CCD transfer drive circuit (not shown), so that data from the CCD image sensor 1a for use in reading of the front face is output in the first half of one scan line period, and data from the CCD image sensor 1b for use in reading of the back face is output in the second half of the period. The analog pixel data output from the two CCD image sensors 1a and 1b are mixed by the mixing circuit (analog switch) 2, as shown in FIG. 3, thus obtaining a single signal line including front-face image data in its first half, and back-face image data in its second half within one scan line.

The image binarization circuit 3 A/D-converts the analog pixel data mixed by the analog switch 2 into digital multi-value pixel data, performs digital image processing necessary for improving image quality, and then performs binarization processing of the pixel data. Subsequently, the binarized pixel data is encoded by sequential processing of the image data compression circuit 5 via the input switching circuit 4 switched to the image binarization circuit 3 side, and the front & back image management circuit 12 switched to a front & back batch output state. The encoded data is input to the image buffer RAM 7 under the control of the image data transfer control circuit 10, and is temporarily stored in the RAM.

When the above-mentioned operations are executed for one original introduced to the reading unit shown in FIG. 2, compressed image data representing images on the front and back faces of the original is stored in the image buffer RAM 7.

After the input line of the input switching circuit 4 is switched to the image data expansion circuit 6 side, the compressed image data temporarily stored in the image buffer RAM 7 is read out by the image data transfer control circuit 10, and is supplied to the image data expansion circuit 6. The compressed image data is decoded by sequential processing of the circuit 6. The decoded signal is subjected to re-encoding processing in the image data compression circuit 5 after the first half (i.e., front-face image data) or the second half (i.e., back-face image data) in one scan line is selected by the front & back image management circuit 12 via the input switching circuit 4. The processing result is transferred to the SCSI bus transfer control circuit 8 under the control of the image data transfer control circuit 10, and is then output onto the SCSI bus 9 under the management of the control circuit 8.

With the above-mentioned operations, front & back batch compressed image data temporarily stored in the buffer RAM 7 for image data is temporarily decoded, the front- or back-face image data is selectively re-encoded in units of pages, and the re-encoded data is output onto the SCSI bus 9. Thus, the image reading apparatus which has the simple and compact image reading unit, as shown in FIG. 2, and can selectively (or continuously) output front- and back-face images can be realized.

Since image data to be stored in the buffer RAM 7 for temporarily storing front & back batch image data is compressed (encoded), a necessary memory capacity can be greatly decreased, thus reducing the cost of the apparatus.

Second Embodiment

Figure 4:
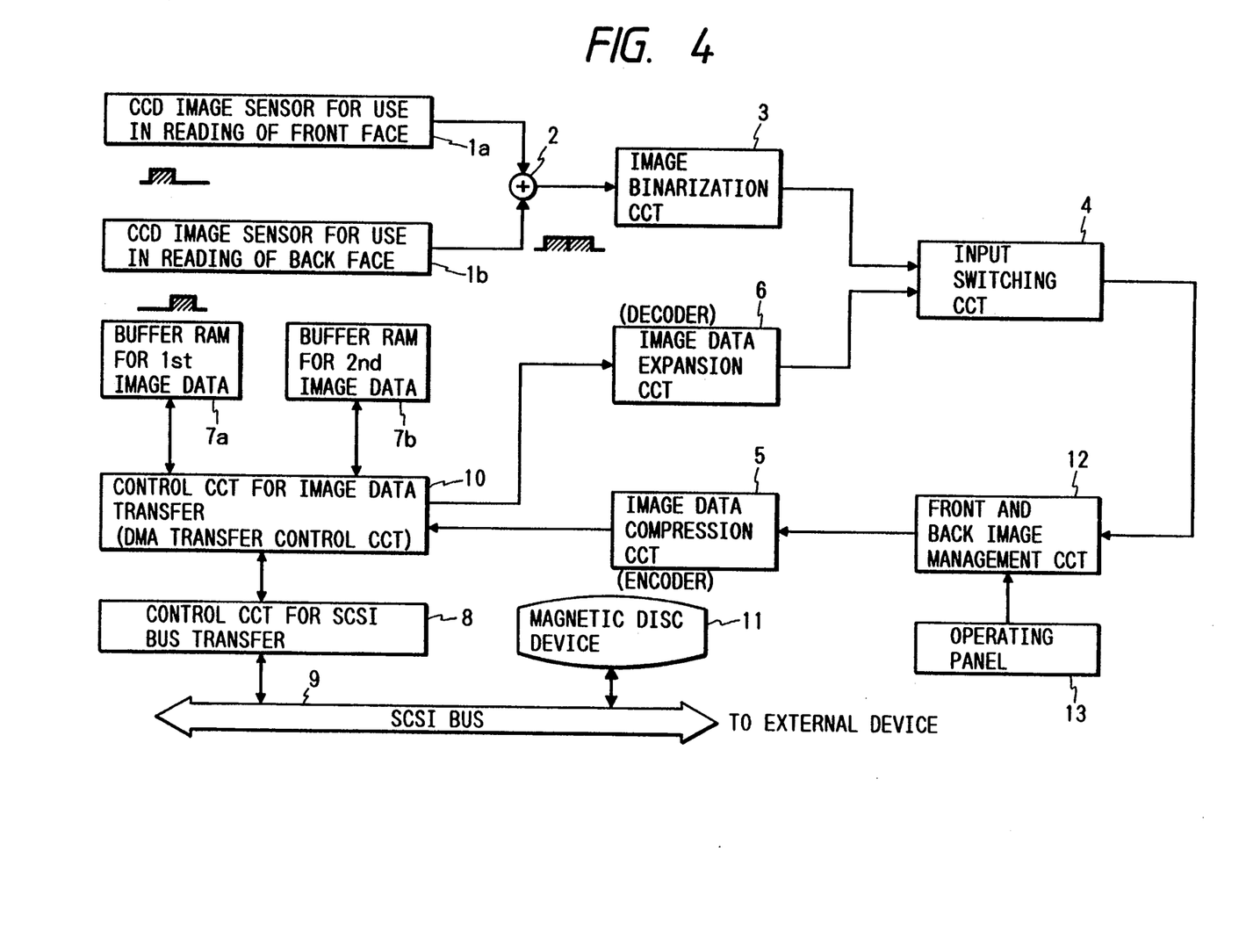
FIG. 4 is a block diagram showing a circuit arrangement of an image reading apparatus according to the second embodiment of the present invention.

FIG. 4 shows a circuit arrangement according to the second embodiment of the present invention. In this embodiment, two buffer RAMs 7a and 7b for storing compressed image data are arranged, and an external storage device 11 is arranged on an SCSI bus 9. Thus, dual-face image data can be continuously read, and a high-speed operation can be attained. In addition, since a plurality of dual-face batch image data can be temporarily stored in the external storage device 11, batch processing of a plurality of image data can also be performed. This embodiment will be described in detail below.

The same reference numerals in FIG. 4 denote block components having the same functions as in FIG. 1. In FIG. 4, the buffer RAM 7a for first image data, and the buffer RAM 7b for second image data have the same function, and the magnetic disk device 11 for temporarily storing image data is connected on the SCSI bus 9.

Image data of a first original read by two CCD image sensors 1a and 1b in the same sequence as in the first embodiment is temporarily stored in the buffer RAM 7a for first image data, and image data of a second original is stored in the buffer RAM 7b for second image data. At the same time, i.e., parallel to the storage operations, an image data transfer control circuit 10 reads out image data stored first from the buffer RAM 7a, and records the readout data in the magnetic disk device 11 via the SCSI bus 9 under the control of an SCSI bus transfer control circuit 8.

The above-mentioned processing operations are repeated to operate the buffer RAMs 7a and 7b in a double-buffer mode, and successively carried dual-face originals can be sequentially recorded on the magnetic disk device 11 without stopping the originals.

After a required number of originals are recorded in the magnetic disk device 11 within the capacity of the device 11, the start page of the series of originals temporarily stored in the magnetic disk device 11 previously is read out, and is re-stored in the buffer RAM 7a or 7b.

The dual-face batch compressed image data re-stored in the buffer RAM 7a or 7b is decoded (expanded) by an image data expansion circuit 6 in the same processing sequence as described in the embodiment shown in FIG. 1, and the decoded image is separated into front- and back-face image data by a front & back image management circuit 12. Thereafter, the separated image data are re-encoded (compressed) by an image data compression circuit 5, and the re-encoded data are output to, e.g., the magnetic disk device 11 on the SCSI bus 9. When the above-mentioned processing sequence is sequentially repeated, front- and back-face image data of a series of previously read originals are separated and re-encoded, and the re-encoded data can be continuously output to another device 11 on the SCSI bus 9.

Therefore, in this embodiment, an original reading speed can be increased as compared to the embodiment shown in FIG. 1, and after a plurality of originals are simultaneously and temporarily stored in the buffer RAMs, they can be simultaneously output after front-/back separation.

In the series of descriptions associated with the embodiment of the present invention, front/back-separated image data is re-encoded (compressed), and is output to the external storage device 11 on the SCSI bus 9. However, binary image data may be output to an external device without being re-encoded (compressed), or front & back batch encoded (compressed) data may be directly output to the external device if necessary.

As described above, the front and back faces of a dual-face original are simultaneously read to be processed as one scan line, and the front- and back-face images are finally separated and output. Therefore, the following effects can be obtained.

① Since dual-face image data can be simultaneously read at substantially the same position, a dual-face image reading apparatus can have a simple and compact arrangement.

② Since front- and back-face image data of dual-face images can be processed as one scan line, a single electrical circuit necessary for image processing need only be prepared. Therefore, a compact, inexpensive apparatus capable of performing high-speed reading processing can be realized.

③ Since front & back image data is finally separated, and front- or back-face image data is selectively output, an image output in the same image format as that of another conventional image processing apparatus can be obtained.

In each of the above embodiments, after dual-face image data are read within one scan line, only one of front-face image data (i.e., the first half of one scan line) and back-face image data (i.e., the second half of one scan line) is selected as effective image data, and the selected image is stored in a file device.

Therefore, since single-face image data of the read dual-face image data is discarded, efficiency in terms of a reading speed of an original image is decreased to $\frac{1}{2}$.

Thus, an arrangement for reading a single-face image without decreasing reading speed efficiency will be described below.

Third Embodiment

Figure 5:
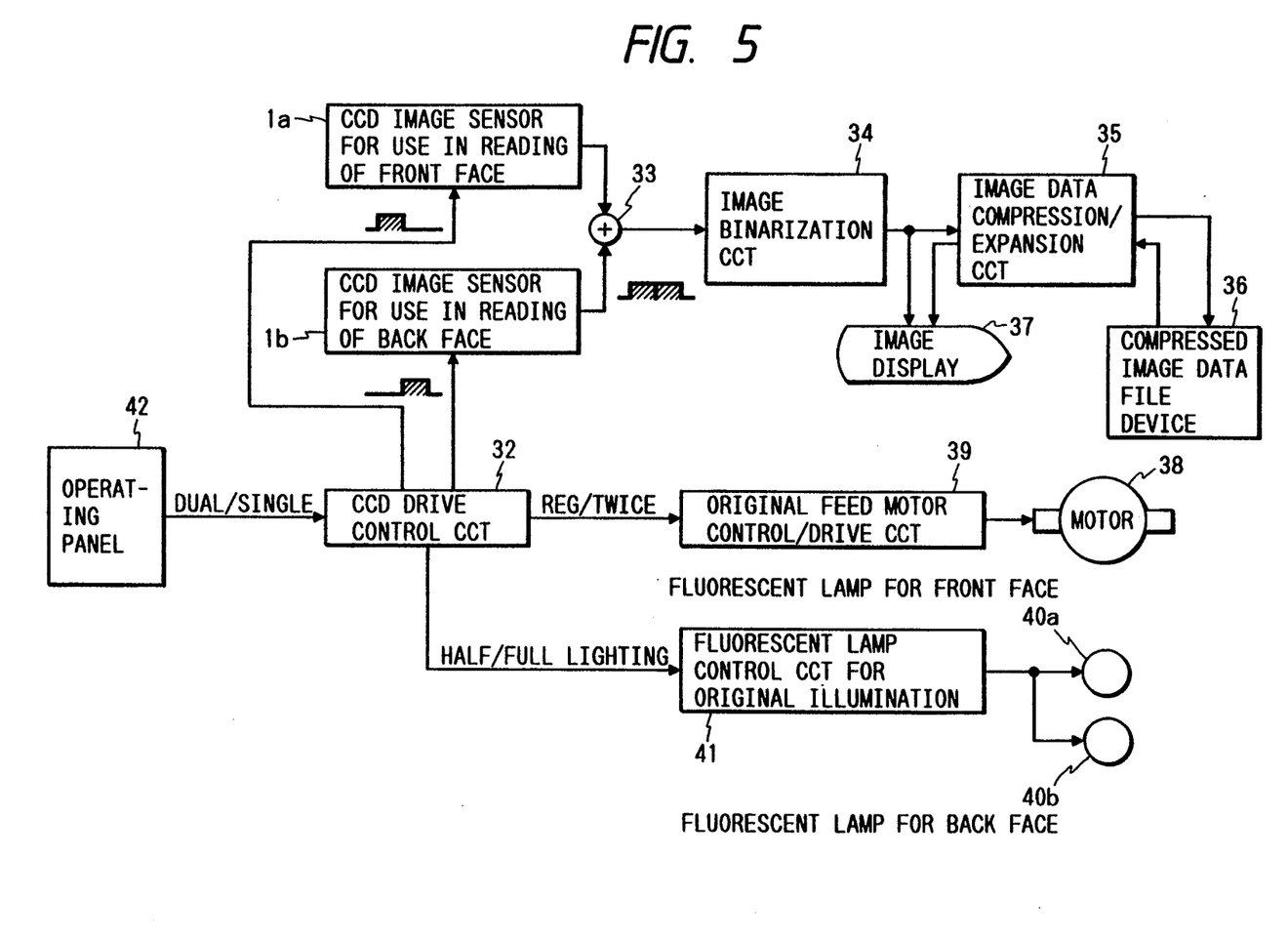
FIG. 5 is a schematic block diagram showing a circuit arrangement of an image reading apparatus according to the third embodiment of the present invention.
Figure 6:
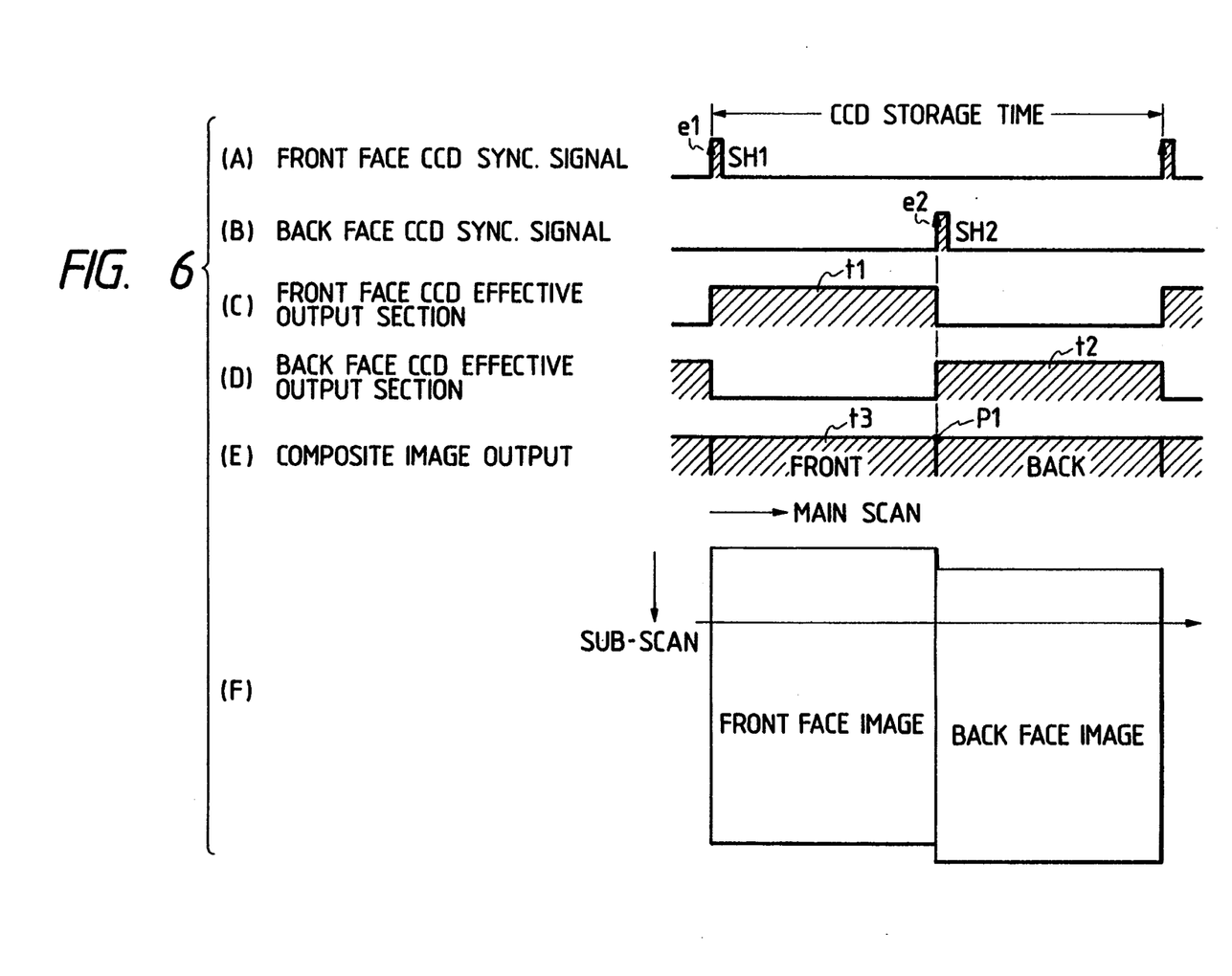
Figure 7:
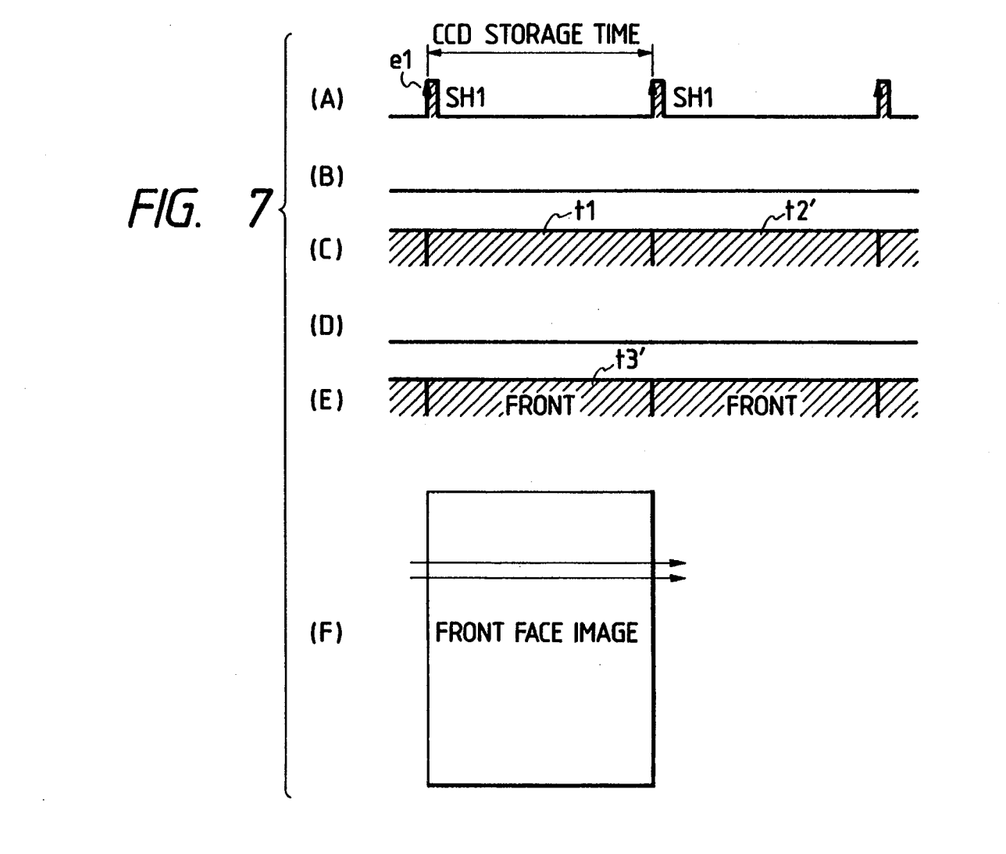

FIG. 5 shows a schematic circuit arrangement of principal part of an image reading apparatus according to the third embodiment of the present invention. CCD image sensors 1a and 1b simultaneously read front and back faces of a carried sheet-like original. A CCD drive control circuit 32 performs drive control for operating these two CCD image sensors 1a and 1b. A mixing circuit 33 comprises an analog switch, and mixes analog pixel data from the two CCD image sensors 1a and 1b to obtain one composite signal. An image binarization circuit 34 A/D (analog-to-digital) converts the analog pixel data from the mixing circuit 33 into digital multi-value pixel data, performs digital image processing necessary for improving image quality, and then binarizes the pixel data using an internal digital comparator. An image data compression/expansion circuit 35 performs compression by encoding an image signal in an original reading mode, and performs expansion by decoding compressed data to an image signal in a reproduction output mode.

A compressed image data file device 36 as one of the external devices receives and stores image data compressed by encoding by the image data compression/expansion circuit 35. An image display 37 as another external device directly monitor-displays a read image in the reading mode, and displays a reproduced image searched from the compressed image data file device 36, and expanded by decoding by the image data compression/expansion circuit 35 in the reproduction output mode.

An original feed motor 38 serves as a drive source for rotating the carrying rollers 20a, 20b, 20c, and 20d shown in FIG. 2 so as to continuously carry sheet-like originals. An original feed motor control/drive circuit 39 controls and drives the original feed motor 38. Fluorescent lamps 40a and 40b are light sources for respectively illuminating the front and back faces of an original to be read. A fluorescent lamp control circuit 41 for original illumination controls the light amounts of the fluorescent lamps 40a and 40b.

The CCD drive control circuit 32 switches a control operation mode in accordance with a selection signal for instructing an effective reading face. This selection signal is normally supplied from a switch on an operating panel 42, or a host device (not shown) such as a personal computer, and is a dual/single-face mode switching signal for instructing a dual-face reading mode or an effective reading face (front or back face) in a single-face reading mode. The selection signal is expressed by two bits, e.g., 11, 01, or 10.

When the selection signal indicates the dual-face reading mode, the CCD drive control circuit 32 performs operations as follows. More specifically, at this time, the CCD drive control circuit 32 outputs sync signals to the two CCD image sensors 1a and 1b for a regular dual-face CCD drive period so that dual-face image data form one scan line, instructs a regular dual-face feed speed mode to the original feed motor control/drive circuit 39, and instructs a half lighting mode (an illumination light amount half that in a full lighting mode) to the fluorescent lamp control circuit 41.

On the other hand, when the selection signal indicates the single-face reading mode, the CCD drive control circuit 32 performs unique operations as follows. More specifically, at this time, the CCD drive control circuit 32 selects, as an effective sensor, one of the CCD image sensors 1a and 1b corresponding to an effective face indicated by the selection signal, and outputs a sync signal to the selected CCD sensor at a period twice the dual-face CCD drive period, so that single-face image data forms one scan line.

At the same time, the CCD drive control circuit 32 instructs a feed speed twice the dual-face feed speed to the original feed motor control/drive circuit 39 so as to obtain the same subscan resolution as in the dual-face reading mode, and to improve reading efficiency in the single-face reading mode. The circuit 32 instructs a full lighting mode to the fluorescent lamp control circuit 41 to obtain a light amount twice that in the dual-face reading mode. In order to compensate for a halved charge storage time of the CCD image sensor 1a or 1b in correspondence with the doubled original feed speed, the original illumination light amount is doubled. Thus, storage efficiency of the compressed image data file device 36 can be prevented from being impaired, and at the same time, single-face reading efficiency can be improved without degrading image quality.

As a light source for illuminating an original in an image reading apparatus of this type, a green fluorescent lamp suitable for sensitivity characteristics of a CCD image sensor is normally used. After a power switch is turned on, a time on the order of several tens of seconds to several minutes is required until the brightness of the fluorescent lamp is stabilized although it depends on the atmospheric temperature, and a longer time is required as the atmospheric temperature goes lower. This means that the apparatus cannot be used simply because of an insufficient light amount of the fluorescent lamp for illumination though all the other functions can be used. Meanwhile, in order to perform a twice-speed original carrying operation, the CCD image sensor used in reading must be operated at a drive period twice that in the dual-face reading mode (i.e., a half drive period). As a result, since a storage time of the CCD image sensor is halved, the illumination light amount for illuminating an original must be doubled so as to obtain the same output value of the CCD image sensor as that in the dual-face reading mode. This poses a serious problem in a twice-speed original carrying operation in consideration of the fact that characteristics of a stabilization curve of the brightness of the fluorescent lamp are expressed by an integral curve (e.g., a curve representing a voltage across C (capacitor) when a CR circuit is charged).

In this embodiment, a third drive mode for operating the CCD image sensor 1a or 1b used in reading at the same drive period as that in the dual-face reading mode before the fluorescent lamp is stabilized, is available, as will be described later. Thus, even in the single-face original reading mode, the apparatus can be operated in the same short wait time as in the dual-face original reading mode. Furthermore, when the CCD drive control circuit 32 detects, based on a sensor output (not shown), that the light amount of the fluorescent lamp 40a or 40b has reached a light amount necessary for a twice-speed original carrying operation after an elapse of a certain time from power-on, it automatically starts the twice-speed operation. Therefore, a single-face original can be very efficiently read immediately after the power switch is turned on.

Figure 8:
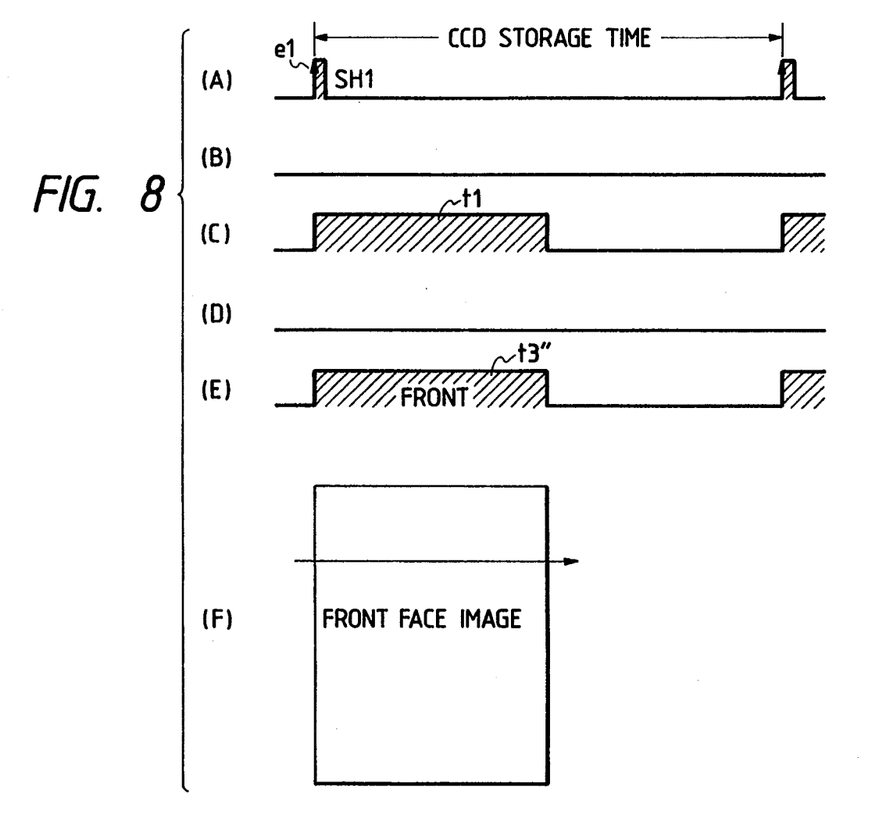

FIGS. 6(A) to 8(F) show drive timings in the respective operation mode of the CCD image sensor according to the embodiment of the present invention. FIGS. 6(F), 7(F), and 8(F) show a correspondence between a composite image and an actual image.

In FIGS. 6(A) to 6(F) showing the dual-face reading mode, a sync signal SH1 indicates an output start timing of a pixel string to the CCD image sensor 1a used in reading of the front face. The CCD image sensor 1a starts outputting of a pixel string in response to a leading edge e1 of the signal SH1, and outputs an effective pixel signal for a section t1 (FIGS. 6(A) and 6(C)). On the other hand, a sync signal SH2 for the CCD image sensor 1b used in reading of the back face is output immediately after the section t1 is ended. The CCD image sensor 1b starts outputting of a pixel string in response to a leading edge e2 of the signal SH2, and outputs an effective pixel signal for a section t2 (FIGS. 6(B) and 6(D)). A section t3 corresponds to a composite image output section in which the two effective signals are switched by the mixing circuit (analog switch) 33 shown in FIG. 5 near a switch point P1 between the effective pixel output section t1 of the CCD image sensor 1a and the effective period t2 of the CCD image sensor 1b, thus mixing the signals as one composite image signal (FIG. 6(E)). When the front- and back-face signals are mixed using the analog switch 33, one image processing system need only be prepared.

The above-mentioned timing control corresponds to a control content performed by the CCD drive control circuit 32 shown in FIG. 5 for the CCD image sensors 1a and 1b. At this time, the CCD drive control circuit 32 supplies a regular speed instruction to the original feed motor control/drive circuit 39, and supplies a half lighting instruction to the fluorescent lamp control circuit 41.

The drive timing of the CCD image sensor when a single-face image (i.e., an effective image only on the front face of an original) is to be read will be described below. A twice-speed drive mode will be described below with reference to FIGS. 7(A) to 7(F). In this case, after the effective output section t1 of the CCD image sensor 1a is ended, no sync signal SH2 for the CCD image sensor 1b is output (FIG. 7(B)), and instead, the sync signal SH1 for the CCD image sensor 1a is successively output (FIG. 7(A)).

Therefore, a pixel string from the CCD image sensor 1a is output for a section t2' following the section t1 (FIGS. 7(C) and 7(D)). When the continuous pixel output from the CCD image sensor 1a is directly output as a composite image output, a front-face image is output for two scan periods during a composite image output section t3' (FIG. 7(E)). In this case, when a subscan speed is double, the same subscan resolution as that in the dual-face reading mode can be obtained. Therefore, in this case, the CCD drive control circuit 32 shown in FIG. 5 performs the above-mentioned timing control operation, supplies a twice-speed instruction to the original feed motor control/drive circuit 39, and supplies a full lighting instruction to the fluorescent lamp control circuit 41 since a storage time for photoelectric conversion of the CCD image sensor is halved as compared to that in the dual-face reading mode.

A regular speed drive operation in the single-face image reading mode will be described below with reference to FIGS. 8(A) to 8(F). In this case, only the sync signal SH1 for the CCD image sensor 1a is output for the same period as that in the dual-face simultaneous reading mode, and no sync signal SH2 for the CCD sensor 1b is output (FIGS. 8(A) and 8(B)). Therefore, in this case, when the pixel output (FIG. 8(C)) from the CCD image sensor 1a is directly output as a composite image, a front-face image is output during the first half of a section t3″, and the second half of the section t3″ corresponds to an ineffective section in which no image signal is output (FIG. 8(E)). In this case, the CCD drive control circuit 32 shown in FIG. 5 supplies a regular speed instruction to the original feed motor control/drive circuit 39, and supplies a half lighting instruction to the fluorescent lamp control circuit 41.

As described above, since the image reading apparatus having three operation modes corresponding to a change in CCD drive method is constituted, an optimal image reading operation can always be performed for both dual- and single-face originals.

Figure 9:
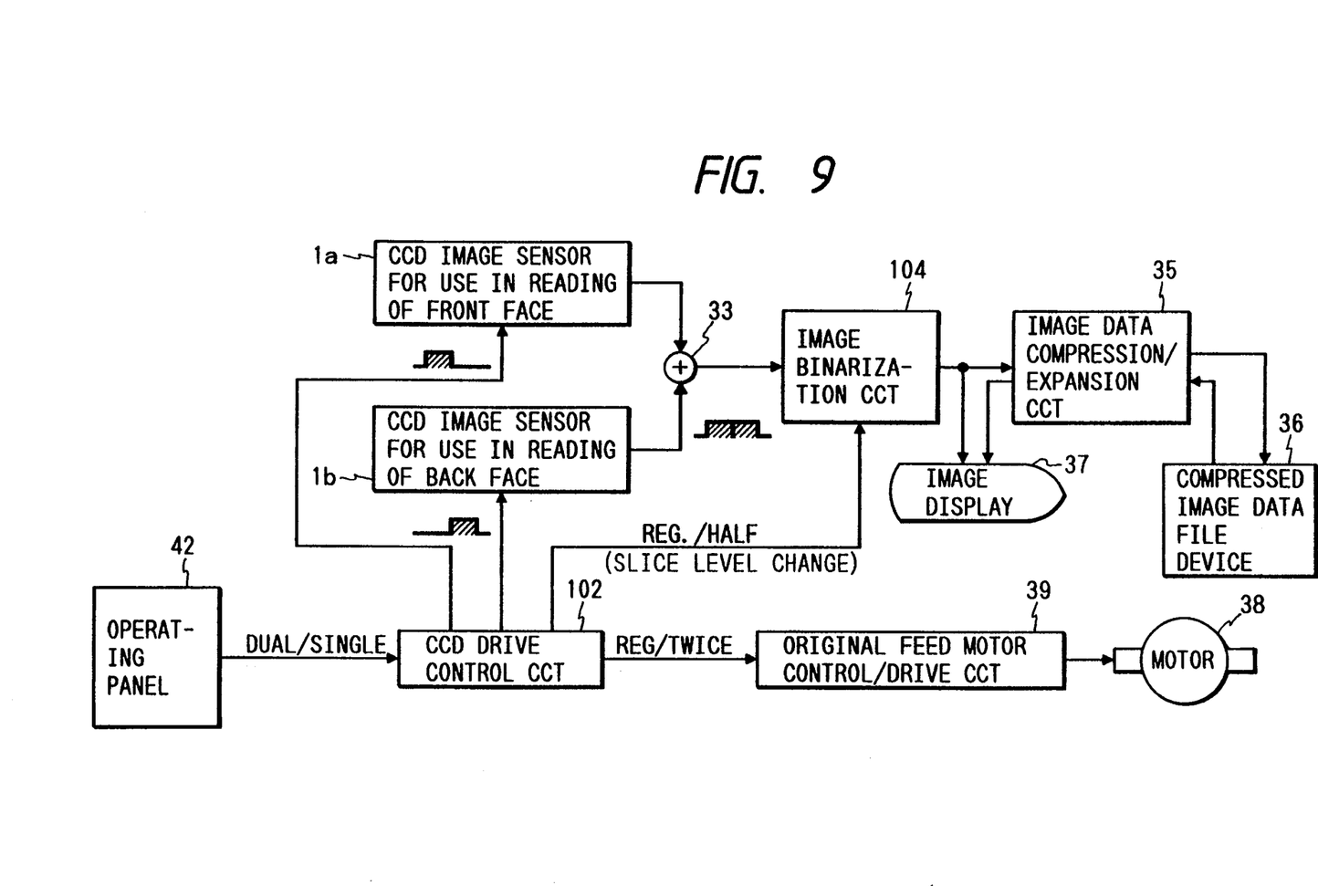
FIG. 9 is a schematic block diagram showing a circuit arrangement of an image reading apparatus according to the fourth embodiment of the present invention.
Figure 10:
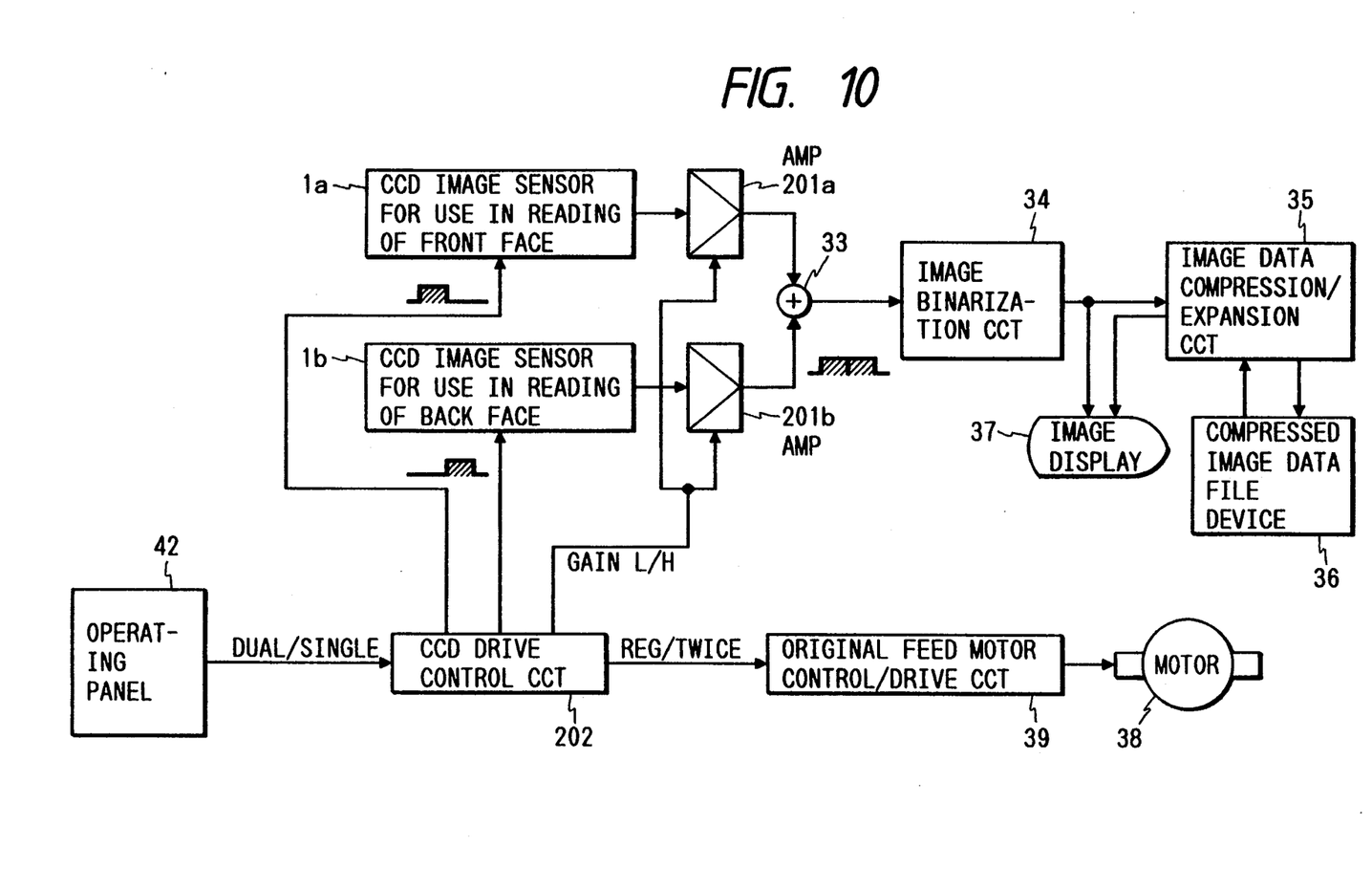
FIG. 10 is a schematic block diagram showing a circuit arrangement of an image reading apparatus according to the fifth embodiment of the present invention.
Figure 11:
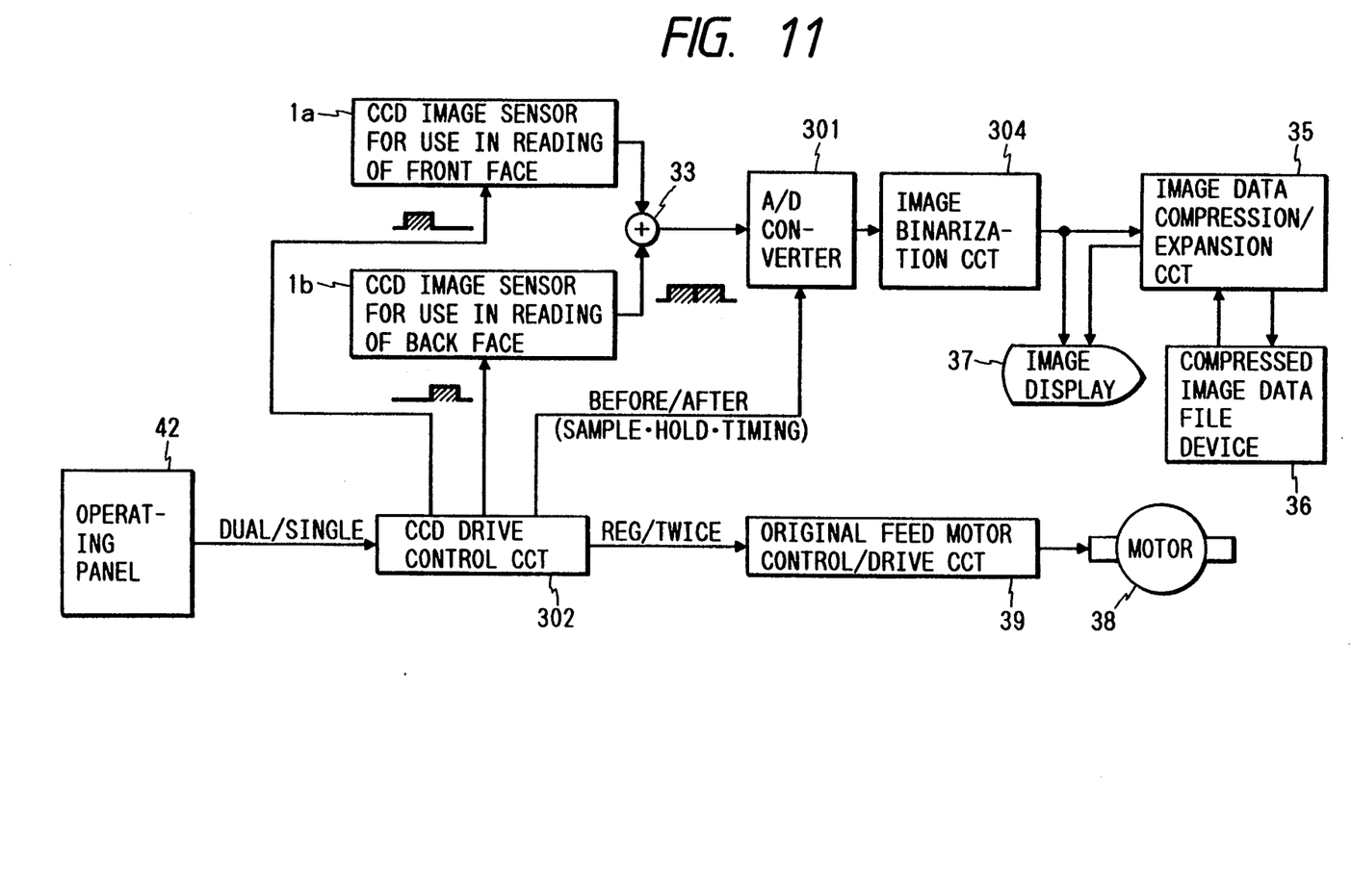
FIG. 11 is a schematic block diagram showing a circuit arrangement of an image reading apparatus according to the sixth embodiment of the present invention.

FIGS. 9 to 11 show schematic circuit arrangements according to the fourth to sixth embodiments of the present invention, and will be described in turn hereinafter.

In the third embodiment shown in FIG. 5, in order to compensate for a half storage time for photoelectric conversion of the CCD due to a doubled original carrying speed, an original illumination light amount is doubled, while in the following three embodiments, the half storage time is compensated for by changing parameters in an electrical circuit. For this reason, the following three embodiments are very effective when a CCD has a margin in its characteristics, e.g., sensitivity. Note that these four embodiments including the embodiment shown in FIG. 5 can be solely carried out, as a matter of course. However, compensation methods in a plurality of embodiments may be combined.

The respective embodiments will be described below.

Fourth Embodiment

FIG. 9 shows a schematic circuit arrangement of a principal part of an image reading apparatus according to the fourth embodiment of the present invention.

In a single-face reading mode of this embodiment, in order to compensate for a half storage time of a CCD due to a doubled original carrying speed, a CCD drive control circuit 102 supplies a slice level switching signal to an image binarization circuit 104, thereby setting a slice level (threshold value) upon binarization to be a value half that in a normal mode (dual-face reading mode). Thus, the same density output as in the dual-face reading mode can be obtained.

Fifth Embodiment

FIG. 10 shows a schematic circuit arrangement of principal part of an image reading apparatus according to the fifth embodiment of the present invention. In a single-face reading mode of this embodiment, in order to compensate for a half storage time of a CCD due to a doubled original carrying speed, a CCD drive control circuit 202 supplies a gain switching signal to an amplifier 201a or 201b for amplifying an output from a corresponding image sensor (these amplifiers are not shown in other embodiments although they are arranged), thereby doubling the gain of the corresponding amplifier as compared to a normal mode (dual-face reading mode). Thus, in both the single- and dual-face reading modes, the same amplified output voltage can be obtained for originals having an identical density.

Sixth Embodiment

FIG. 11 shows a schematic circuit arrangement of principal part of an image reading apparatus according to the sixth embodiment of the present invention. In a single-face reading mode of this embodiment, in order to compensate for a half storage time of a CCD due to a doubled original carrying speed, a sample.hold timing of a pixel signal instructed from a CCD drive control circuit 302 to an A/D converter 301 (which is not shown in other embodiments since it is included in the image binarization circuit 34) is delayed.

Figure 12:
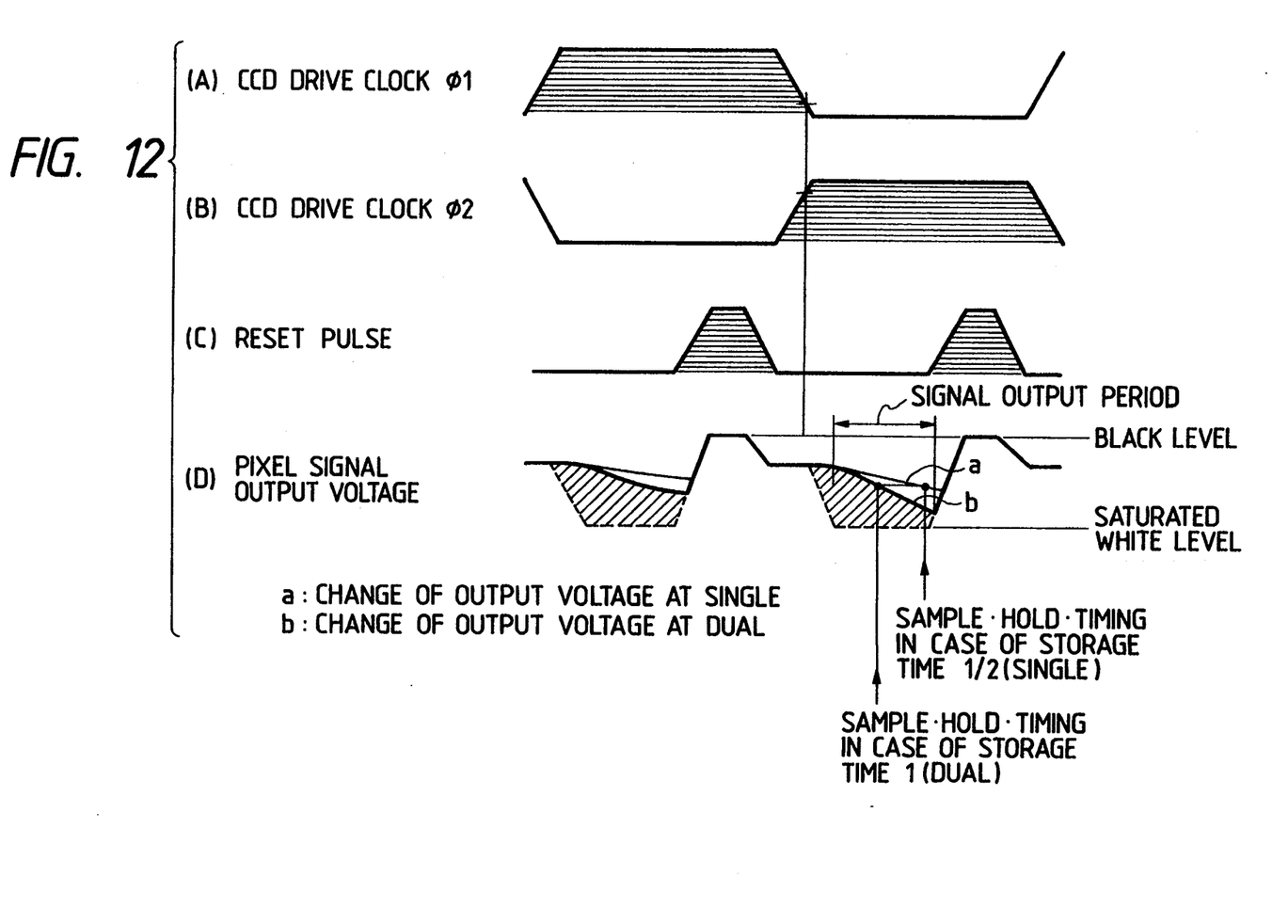

FIGS. 12(A) to 12(D) show change states of a CCD pixel signal output during one clock period in the sixth embodiment. As shown in FIG. 12(D), in a single-face reading mode (i.e., a storage time=$\frac{1}{2}$t), since a change amount of a pixel signal output voltage is halved as compared to that in a dual-face reading mode (i.e., a storage time=1t), the sample.hold timing is changed to be delayed from that in the dual-face reading mode by a predetermined period of time, as shown in FIG. 12(D). Thus, substantially the same output voltage as that in the dual-face reading mode can be obtained.

In the above-mentioned embodiments, the CCD is used as the image sensor. However, the present invention can be applied to image sensors using other solid state image pickup elements. The fluorescent lamp is used as a light source for original illumination. However, the present invention is not limited to this. For example, the present invention can be applied to, e.g., a xenon lamp. The present invention can be applied not only to a copying machine or a facsimile apparatus in which an image reading unit and a recording unit are integrated, but also to an input terminal device for, e.g., a computer.

As described above, in a dual-face image reading apparatus which can continuously and simultaneously read front- and back-face images of an original using a pair of image sensors within one scan line, the drive period of the image sensor is doubled in the single-face original reading mode so as to double the original carrying speed, and a means for compensating for a half storage time of the image sensor due to the doubled carrying speed is arranged. Therefore, an image reading apparatus which can obtain optimal reading performance for both dual- and single-face originals without impairing image quality and reading efficiency can be realized.

When a light source for original illumination requires a considerable time until a predetermined light amount is reached, substantially the same drive control as in the dual-face reading mode (except that only the corresponding image sensor) is selected as an effective sensor is performed in the single-face reading mode. Therefore, a wait time can be shortened, and a good image can be obtained.

Some preferred embodiments of the present invention have been described. However, the present invention is not limited to the arrangements of these embodiments, and various changes and modifications may be made within the scope of claims.

What is claimed is:

1. An image reading apparatus comprising:
    carrying means for carrying an original at one of first and second speeds, the first speed being lower than the second speed;
    first reading means for reading an image on a front face of the original being carried by said carrying means, and for supplying an image signal representing the image on the front face;
    second reading means for reading an image on a back face of the original being carried by said carrying means, and for supplying an image signal representing the image on the back face;
    instruction means for instructing one of a first mode in which the images on the front and back faces of the original are read, and a second mode in which the image on one of the front and back faces of the original is read;
    control means for controlling said first and second reading means and said carrying means in accordance with the mode instructed by said instruction means so that said first and second reading means simultaneously read the images on the front and back faces of the original being carried at the first speed by said carrying means when the first mode is instructed, and one of said first and second reading means reads the image on one of the front and back faces of the original being carried at the second speed by said carrying means when the second mode is instructed; and
    level varying means for varying levels of the image signals corresponding to the front and back faces of the original in accordance with the mode instructed by said instruction means, wherein said level varying means varies a gain used for amplifying the image signals.

2. An apparatus according to claim 1, wherein said level varying means increases the levels of the image signals in the second mode, as compared to the first mode.

3. An apparatus according to claim 1, wherein said level varying means varies a light-emission amount of a light source for illuminating the original.

4. An image reading apparatus comprising:
    carrying means for carrying an original at one of first and second speeds, the first speed being lower than the second speed;
    reading means for reading an image from at least one of the front face and rear face of the original being carried by said carrying means, and for supplying an image signal representing the read image;
    changing means for changing the speed at which the original is carried by said carrying means; and
    level varying means for varying a level of the image signal representing the image by varying a reference value used for binarizing the image signal, wherein said level varying means decreases the level of the image signal when the original is carried at the first speed, and said level varying means increases the level of the image signal when the original is carried at the second speed.

5. An apparatus according to claim 4, wherein said reading means reads the images on the front and rear faces of the original being carried at the first speed, and reads the image on one of the front and rear faces of the original being carried at the second speed.

6. An apparatus according to claim 4, further comprising instruction means for instructing one of a first mode in which the images on the front and rear faces of the original are read, and a second mode in which the image on one of the front and rear faces of the original is read.

7. An apparatus according to claim 6, wherein said changing means changes the speed in accordance with the mode instructed by said instruction means.

8. An apparatus according to claim 6, wherein said level varying means varies the level in accordance with the mode instructed by said instruction means.

9. An image reading apparatus comprising:
    carrying means for carrying an original at one of first and second speeds, the first speed being lower than the second speed;
    reading means for reading an image from at least one of the front face and rear face of the original being carried by said carrying means, and for supplying an image signal representing the read image;
    changing means for changing the speed at which the original is carried by said carrying means; and
    level varying means for varying a level of the image signal representing the image by varying a gain used for amplifying the image signal, wherein said level varying means decreases the level of the image signal when the original is carried at the first speed, and said level varying means increases the level of the image signal when the original is carried at the second speed.

10. An apparatus according to claim 9, wherein said reading means reads the images on the front and rear faces of the original being carried at the first speed, and reads the image on one of the front and rear faces of the original being carried at the second speed.

11. An apparatus according to claim 9, further comprising instruction means for instructing one of a first mode in which the images on the front and rear faces of the original are read, and a second mode in which the image on one of the front and rear faces of the original is read.

12. An apparatus according to claim 11, wherein said changing means changes the speed in accordance with the mode instructed by said instruction means.

13. An apparatus according to claim 11, wherein said level varying means varies the level in accordance with the mode instructed by said instruction means.

* * * * *

UNITED STATES PATENT AND TRADEMARK OFFICE
CERTIFICATE OF CORRECTION

PATENT NO. : 5,392,135

DATED : February 21, 1995

INVENTOR : MASAMI AMEMIYA

It is certified that error appears in the above-identified patent and that said Letters Patent is hereby corrected as shown below:

<u>ON TITLE PAGE</u>

<u>At [56] References Cited</u>

Insert:

--FOREIGN PATENT DOCUMENTS

| | | | |
|---|---|---|---|
| 3043675 | 12/1987 | Germany | B07C/5/342 |
| 3420049 | 12/1984 | Germany | G06F/3/05 |
| 3610271 | 10/1986 | Germany | H04N/1/028 |
| 1-198174 | 8/1989 | Japan | |
| 63-229961 | 9/1988 | Japan | |
| 1-162071 | 6/1989 | Japan--. | |

UNITED STATES PATENT AND TRADEMARK OFFICE
CERTIFICATE OF CORRECTION

PATENT NO. : 5,392,135

DATED : February 21, 1995

INVENTOR : MASAMI AMEMIYA

It is certified that error appears in the above-identified patent and that said Letters Patent is hereby corrected as shown below:

<u>ON TITLE PAGE</u> (cont'd.)

<u>At [56] References Cited</u>

<u>Under "U.S. PATENT DOCUMENTS"</u> insert:

```
--4,692,812   9/1987   Hirahara, et al. ........ 358/285
  4,352,988  10/1982   Ishida ................. 250/559--.
```

Signed and Sealed this

Ninth Day of May, 1995

Attest:

BRUCE LEHMAN

Attesting Officer     Commissioner of Patents and Trademarks